United States Patent [19]

Zippel

[11] Patent Number: 5,589,132

[45] Date of Patent: Dec. 31, 1996

[54] METHOD AND DEVICE FOR PURIFYING AND MOISTENING AIR

[76] Inventor: Gunther Zippel, Pommernstrasse 29, 93073 Neutraubling, Germany

[21] Appl. No.: 382,193

[22] Filed: Feb. 1, 1995

[30] Foreign Application Priority Data

Feb. 3, 1994 [DE] Germany .......................... 44 03 358.3
Aug. 19, 1994 [DE] Germany .......................... 44 29 502.2

[51] Int. Cl.⁶ .................................. A61L 9/20; F24F 6/14
[52] U.S. Cl. ................................ 422/24; 422/4; 422/121; 422/124; 55/256; 261/92; 261/DIG. 80; 250/436; 250/438
[58] Field of Search .................................. 422/4, 24, 121, 422/123, 124; 250/432 R, 435, 436, 438; 55/279, 230, 260, 256; 261/92, DIG. 80, 81, DIG. 48, 36.1, 119.1, 106, 120

[56] References Cited

U.S. PATENT DOCUMENTS

| 2,638,644 | 5/1953 | Rauhut | 422/24 |
| 3,474,598 | 10/1969 | Keuls | 422/120 |
| 3,576,593 | 4/1971 | Cicirello | 422/24 |
| 4,490,311 | 12/1984 | Shepherd | 261/92 |

Primary Examiner—Robert J. Warden
Assistant Examiner—Theresa T. Snider
Attorney, Agent, or Firm—Hoffman, Wasson & Gitler

[57] ABSTRACT

An air purifying and moistening device comprises a suction section having an air entrance opening, filter means at said opening and a motor-driven fan, an air purifying section including at least an ultraviolet radiation sterilization lamp, and a water ducting section within which the sterilized air is brought into contact with the water surface before it is discharged into the room. The water supply is a water trough or water tray with a large surface area of substantially stagnant water volume, which trough or tray is covered with a removable cover plate at a distance above the water surface. A casing forms a substantially closed air passage channel part of which is formed within said housing and another part of which is formed by the water surface, the lateral walls of the trough and the cover plate above said water surface. The exit-side of the air passage channel is formed as an air exit opening of said trough, which is restricted by said cover plate at the top, by the lateral walls at both sides, and by the front wall of the trough at the bottom.

14 Claims, 6 Drawing Sheets

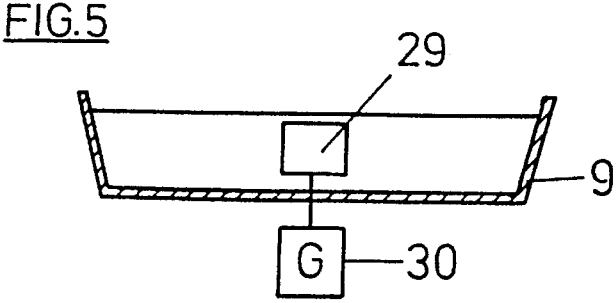
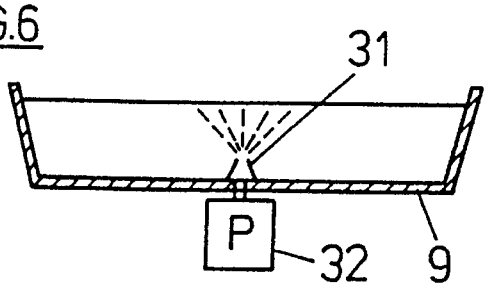
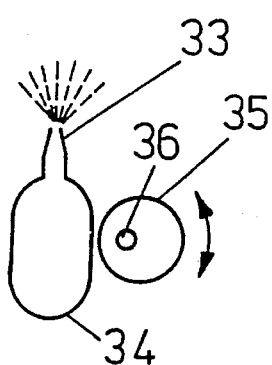
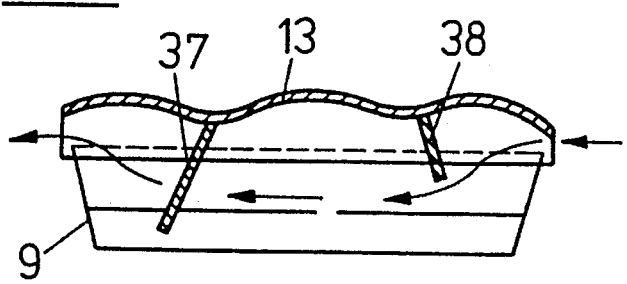
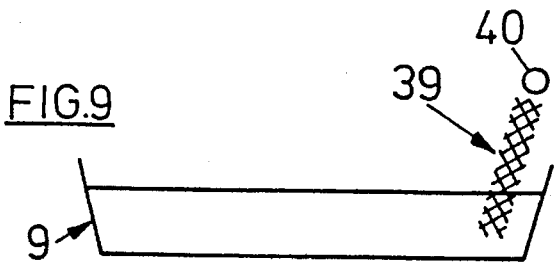
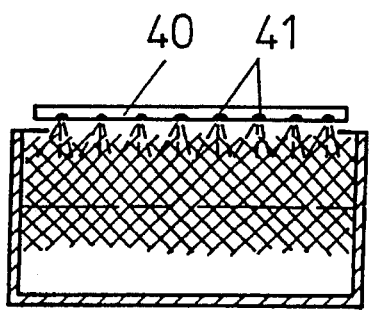
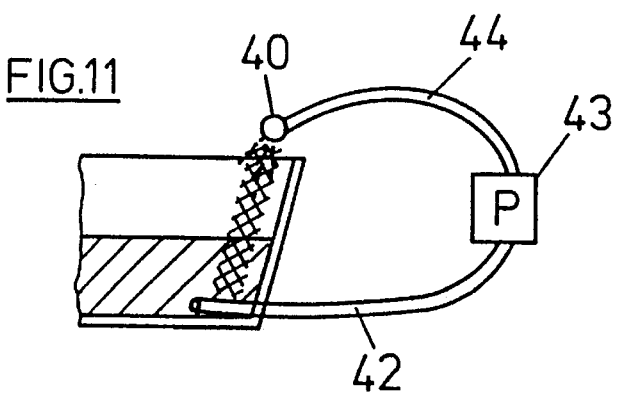

5,589,132

METHOD AND DEVICE FOR PURIFYING AND MOISTENING AIR

FIELD OF THE INVENTION

This invention refers to a method and device for purifying and moistening air, especially for living rooms.

BACKGROUND OF THE INVENTION

Known methods and devices for moistening air in general are based on the fact that the airstream generated by a fan is passed through a spray of water mist or through a jet of flowing water, preferably circulated water, whereby the airstream absorbs moisture. Such known devices are expensive to manufacture and to operate and are not very effective.

SUMMARY OF THE INVENTION

It is an object of this invention to improve known methods and devices of said type in such a manner that a simulation of the sea climate in combination with a stagnant water supply is obtained.

It is also an object of this invention to provide a method and a device which releases the air within a living room or the like from din particles, germs and bacteria.

It is a further object of this invention to provide a method and a device by means of which the purified and moistened air within a living room can be enriched with mineral salts and/or fragrances, or the like.

A method for purifying and moistening air within restricted areas, especially living and working rooms, according to which an airstream is drawn into the casing of a device which airstream is filtered at the entrance of the device, is sterilized by ultraviolet radiation, is brought into contact with a water supply, and is discharged into the room as a purified and moistened airstream, comprises passing the purified airstream through a channel-type casing by means of a fan, and is passed over a substantially stagnant water surface of large area provided within a trough, a tray, or the like, through an air channel which is the extension of the channel within the casing and which is formed by the water surface and a cover plate arranged distant above said water surface.

The water supply is a water trough or a water tray with a large surface area of substantially stagnant water and is covered with a removable cover plate at a distance above the water surface. A casing of the device forms a substantially closed air passage channel, part of which is formed within said housing, and another party of which is formed by the water surface, the lateral walls of the trough or tray, and the cover plate above the water surface. The exit-side of the air passage channel is formed as an air exit opening of said trough, which is restricted by said cover plate at the top, by the lateral walls, and by the front wall of the trough at the bottom.

Basically, a method and a device according to the subject invention removes from the air, corresponding rooms, dirt particles, germs and bacteria to enrich the air with valuable mineral salts, etc. to obtain an optimum air moisture and to improve the wellness of the people by obtaining an attractive climate within the rooms. The airstream generated by a fan is passed through a filter, over an UV-lamp (lamp emitting ultraviolet radiation) and over a water surface so that the natural conditions at the beach are simulated, namely an airstream in contact with the water surface which releases oxygen from the water supply. In this manner the conditions at the seaside are simulated by cooperation between the surface of the sea and the air circulation immediately above the surface so that a climate will be obtained which is adapted to the natural conditions at the seaside. Furthermore, the invention allows the user of the device to look at the water surface over which the airstream is passed; the water surface will be curled by the airstream flowing over it or is slightly moved in waves close to the natural conditions at the seaside, including wave formation.

The sea is simulated by means of a large surface area water reservoir, such as a trough or tray fastened to the casing of the device in a releasable manner, and filled with a substantially stagnant water supply. Distant from and above the water surface, a transparent cover plate is provided which rests upon the lateral walls of the trough and which together with the front wall of the trough forms an exit gap through which the airstream enriched with moisture and oxygen is delivered into the room. Between the upper edge of the water supply and the underside of the cover plate a channel-like, restricted airstream path is formed.

With a special embodiment of this invention the coverplate is formed with corrugations which extend transversely to the flowing direction of the airstream so that the user gets the impression of a water surface with propagating waves. The trough may include wave generating means, f.e. a bucket wheel which generates wave motions on the water surface, the height of the waves being variable by varying the speed of the rotating wheel which is driven by a motor. By beating the water surface with the rotating wheel the intake of oxygen into the airstream flowing over the water surface is improved and oxygen enrichment of the water within the trough is obtained. Furthermore, this type of wave generating means is to simulate the murmur of the sea so that seaside conditions, such as sea-breeze will be simulated not only optically but also acoustically in connection with purifying and moistening the airstream.

This effect can be further improved by additionally adding mineral salts, fragrances, such as aromatic oils, and/or other additives improving the air within the room. Said additives can be applied in tablet or liquid form to the water supply such as a spray to the airstream, etc. so that the airstream flowing through the device takes up such additional additives and discharges them together with the moisture into the surrounding room. Said additives also can be provided at the exit opening of the water trough through which the airstream has been passed before leaving the device.

According to this invention the fan section and the water trough or water tray are arranged and combined in such a manner that they can be disengaged from each other and can be connected or pinned together in order to enable the operator to remove and handle the water trough in a simple manner, empty the trough, clean it and fill in fresh water. In order to simplify the filling of water into the water trough or tray the coverplate is removably positioned and rests on the lateral walls of the trough. With a corrugated coverplate. the top edges of the two lateral walls of the water trough are formed in a congruent corrugated shape. With this embodiment of a water trough being removable from the casing it is useful to support the rotating wheel within the lateral walls of the casing so that when removing the water trough from the device the wheel remains fastened to the lateral walls of the casing. The water trough can be fastened or pinned onto the casing of the device, such as by clamping or locking means known per se. In order to be able to operate and service the device in a simple manner it is important that the water trough itself does not include any driving elements or electrical parts which will have to be disconnected when removing the water trough from the casing of the device.

The device according to this invention has a casing which is extremely compact and of low height, and which is fastened to the water trough. The combination of the casing of the device and the water trough has a rather large surface area and accordingly is extremely stable. The large-area water trough results in a large water surface so that there is an extremely intensive contact between the airstream generated by the fan and the water surface. The air entrance opening has about the width of the air passing channel so that a large area entrance section is provided. The fan is operable in at least two stages by means of a switch arranged at one of the lateral walls of the casing. A further switch is provided for switching the drive for the rotating wheel or a corresponding pump drive which instead of a rotating wheel can be used for moving the water in waves within the trough.

Furthermore, the invention proposes to use a dispersing or spraying device, such as an ultrasound oscillator in order to disperse or spray water at the water surface. The dispersed or sprayed water between the water surface and the coverplate is discharged by the through-flowing airstream generated by the fan at the exit opening of the water trough as mist or froth, and simulates to a certain extent the effect of the froth of a surge. This effect is increased by adding mineral salts to the water which salts are dissolved within the water and are discharged from the device together with the mist. A similar effect also can be reached by means of a pump with spraying nozzles. The pump urges water from the trough through the spraying means and atomizes water above the water surface so that a fine mist of water is provided at the exit of the device. Rather than using a motor-driven pump with spraying nozzles according to the invention pressure bellows can be used which include a spraying nozzle and which are acted upon by pressure means, f.e. an excentric device, so that from a flexible balloon, which is filled with water, mist can be produced in a controlled manner.

In addition to passing the airstream through the channel between the cover plate and the water surface within the water trough, and to the effect of moistening the air discharged from the device, the invention also proposes to arrange barrier means at the cover plate or at the trough, which urges the airstream from the fan flowing through the trough into the water supply so that the air is passed through the water with the result that the air is purified in a natural way. The barrier means can be a plate which extends substantially across the width of the trough; for example, the upper end thereof is fastened to the cover plate and the lower end extends into the water, whereby the barrier plate can be inclined in the direction of the airstream in order to urge the airstream through the water supply. If additional whirls will be required, the barrier means also can be inclined in the opposite direction. A barrier plate also can end above the water surface so that only a restricted amount of air is passed through the upper water layer. A barrier plate either can be of solid structure or be provided with apertures so that the amount of air passing through the water surface can be controlled. The plate also can be provided as a shutter or as a double wall with openings in both walls which walls are movable relative to each other so that the apertures overlap each other more or less.

Furthermore, the invention proposes to provide a mesh or a texture, weft or the like at the entrance side of the water trough which mesh is formed as an upright wall or plate, which to a substantial portion is arranged above the water surface and partly within the water. Water, f.e. with added mineral salts, is continuously or intermittently passed from the top to the bottom over this mesh, for example by means of a pump arranged within the fan casing the suction tube of which ends within the water supply of the trough and the discharge tube ends above the mesh. The discharge tube passes the water into a hose or tube extending transverse to the trough and parallel to the mesh. This tube or hose is provided with a plurality of holes (similar to a garden hose) or nozzles through which the water is dripped or sprayed onto the mesh. This results in a continuous water circulation, and the water down the mesh results in a water spray and oxygen enrichment, simulating the effect of a wall of brushwood in saltworks so that the quality of the discharged air is improved.

BRIEF DESCRIPTION OF THE DRAWINGS

Embodiments of the invention are described in the following with reference to the figures, in which FIG. 5 shows schematically an ultrasound vibrator within the water trough, FIG. 6 shows schematically a pump with a spraying system within the water trough, FIG. 7 shows a different embodiment of a pump drive, FIG. 8 is a barrier surface in connection with the cover plate and the water trough, FIG. 9 is a schematic picture of the water trough with a wall made of mesh, FIG. 10 is a schematic rear view of FIG. 9, FIG. 11 shows the operation of the pump system with the mesh.

FIG. 15 a front view of the bottom pan of the device of FIG. 14, and

FIG. 16 a side view of the bottom part of the device of FIG. 14.

DETAILED DESCRIPTION OF THE PREFERRED EMBODIMENTS

Figure 1:
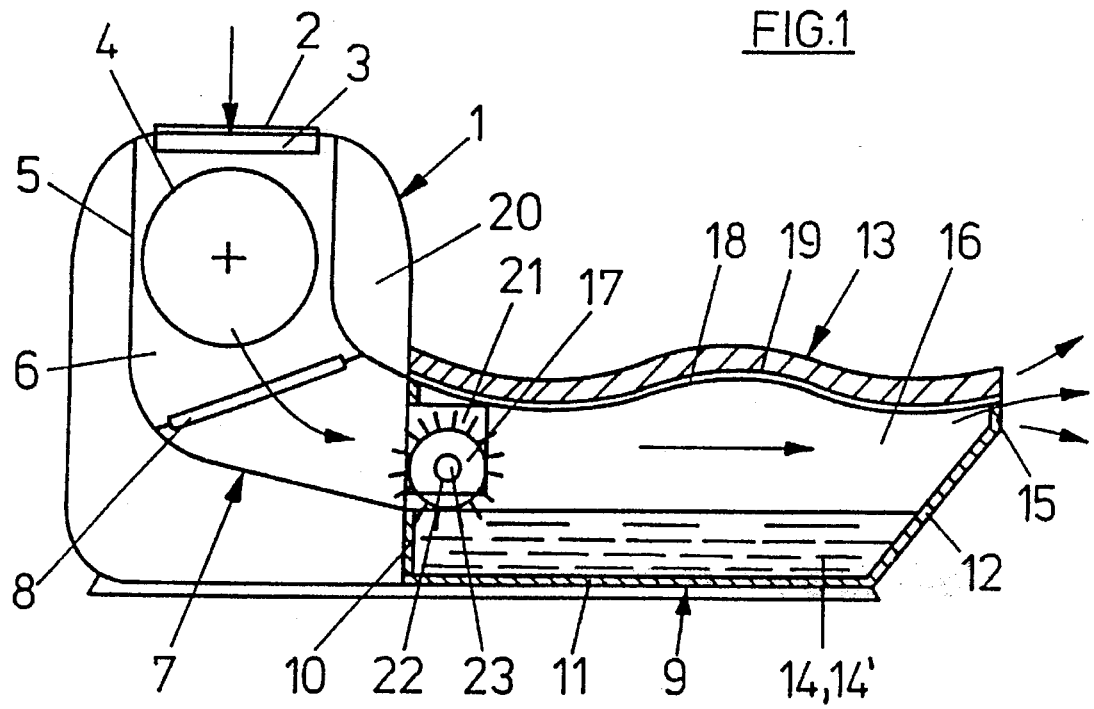
FIG. 1 shows a schematic cross section of the device according to the invention.
Figure 2:
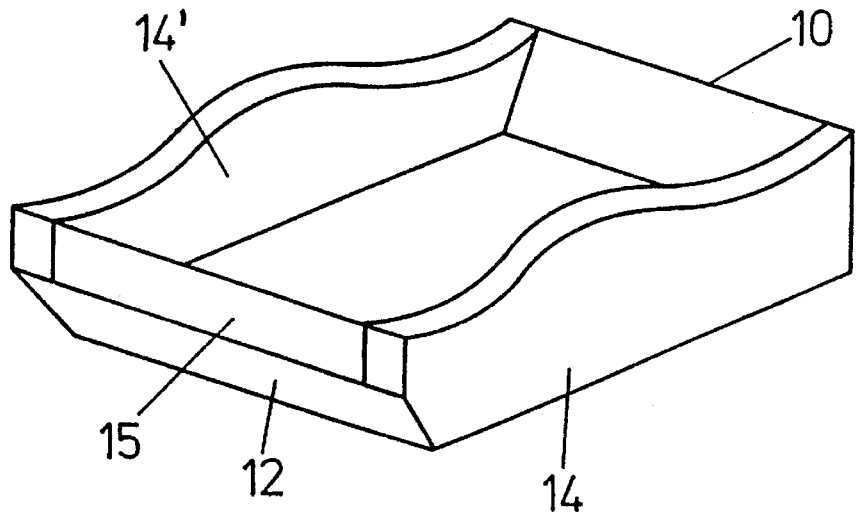
FIG. 2 shows the water trough or water tray with the lid removed.

According to the schematic embodiment of FIG. 1 a casing 1 is provided with an air entrance opening 2 with a mechanical filter 3 at the top of the casing. Underneath the entrance opening a cross-current ventilator 4 is provided which is enclosed within wall 5 of an air passage channel 6. The closed wall 5 at 7 is curved on the lower and forward area from a substantially vertical into a substantially horizontal direction. Within channel 6 a sterilization lamp 8 for ultraviolet radiation (UV-lamp) is arranged over which the airstream is passed. A water trough or water tray 9 is removably fastened to the fan casing 1 at the rear portion 10 thereof. The trough or tray 9 comprises the bottom wall 11, the front wall 12, the upper cover plate 13, the two lateral walls 14, 14' and the exit opening 15 through which the treated airstream from the ventilator 4 and through the trough is discharged into the surroundings, which is a room. 16 shows the airstream channel above the surface of the water supply within the trough 9. A bucket wheel 17 is electrically driven and dips into the water supply from above in order to produce waves at the water surface—the bucket wheel is an additional element for operating the device. 18 is the upper edge of the side walls 14 of the trough 9 and 19 shows the bottom edge of the coverplate 13, which is conform with edge 13. The cross-section areas 18 and 19 are curved in the special embodiment and extend congruent with each other. The lateral walls 20 of casing 1 are provided with extensions 21 forming bearings 22 for supporting shaft 23 of the bucket wheel 16. The water trough 9 in its operating position is added to the casing 1 and is fastened to it by plugs or any other locking means so that the water trough can be removed from the casing 1 in a simple and fast manner without the necessity of removing driving or electrical parts.

Figure 3:
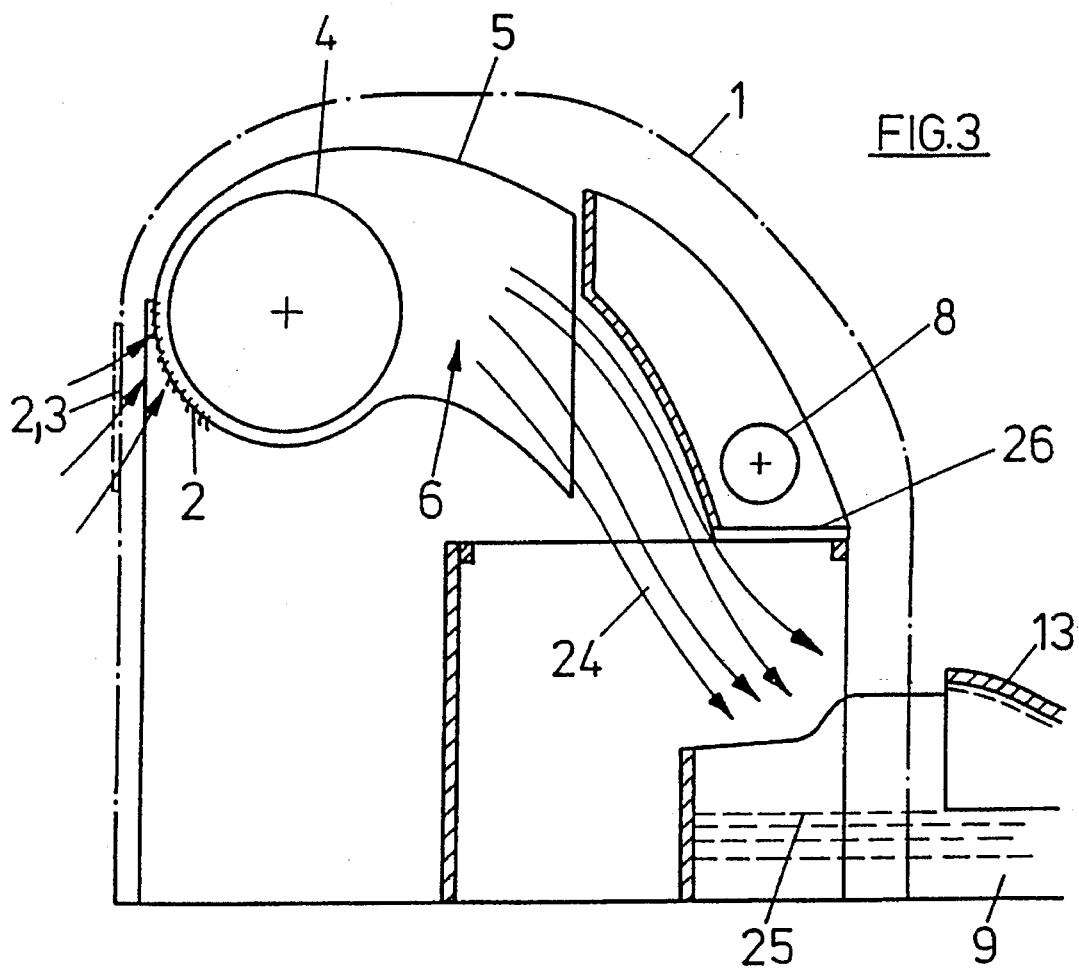
FIG. 3 is a cross section through an embodiment of the device according to the invention.

FIG. 3 shows schematically and in cross-section an embodiment of the device according to the invention with a water trough 9. For the embodiment according to FIG. 3 the same parts are marked with the same reference numerals as in FIG. 1. The airstream 24 passes from the air passage channel 6 downwardly inclined into the trough 9 between cover plate 13 and water surface 25. A foil or plate 26, which is permeable for radiation, separates the lamp 8 from the airstream 24, but allows the radiation to act upon the airstream.

Figure 4:
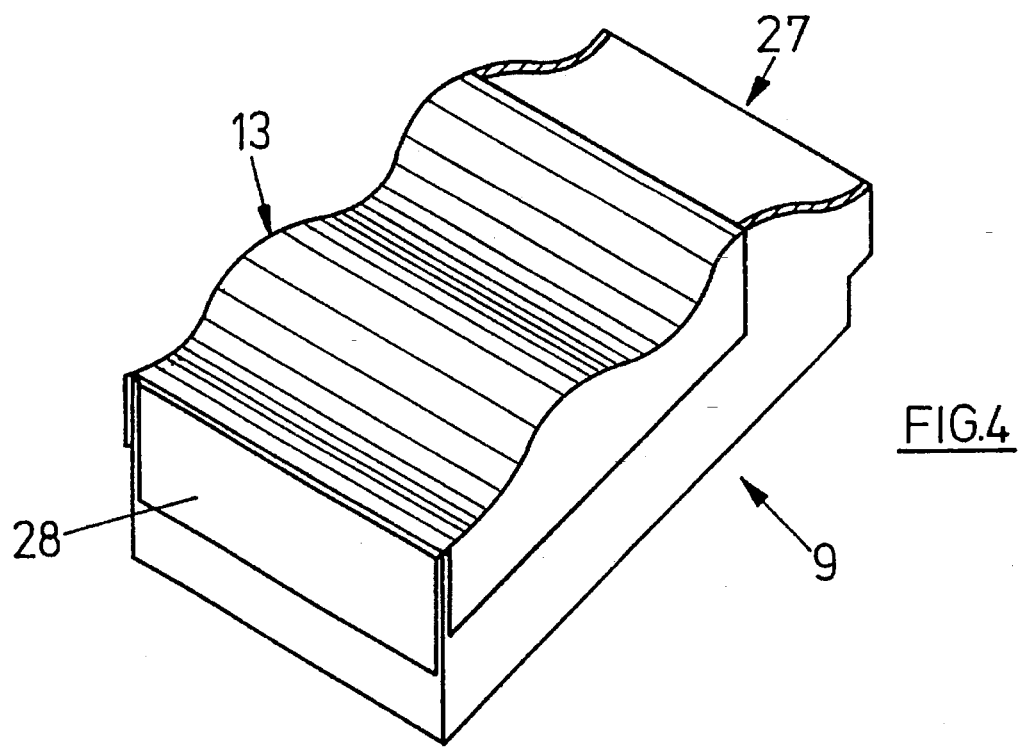
FIG. 4 is an embodiment of the water trough or water tray with the lid.
Figure 12:
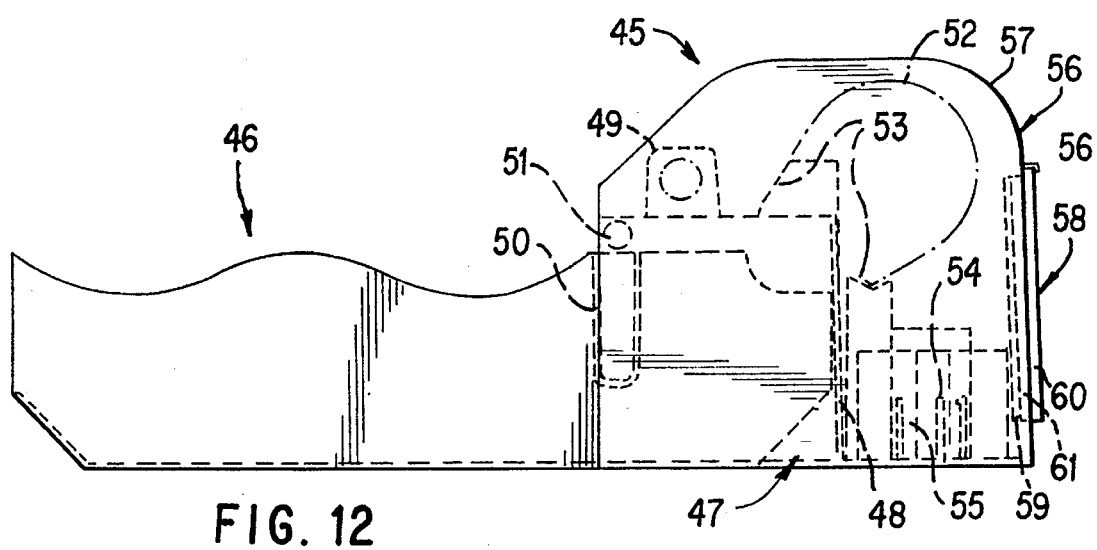
FIGS. 12–16 show a special preferred embodiment of the invention, namely FIG. 12 a lateral view of the device, FIG. 13 a rear view of the device according to FIG. 12, FIG. 14 a plan view on the device according to FIG. 12 (without water trough)
Figure 14:
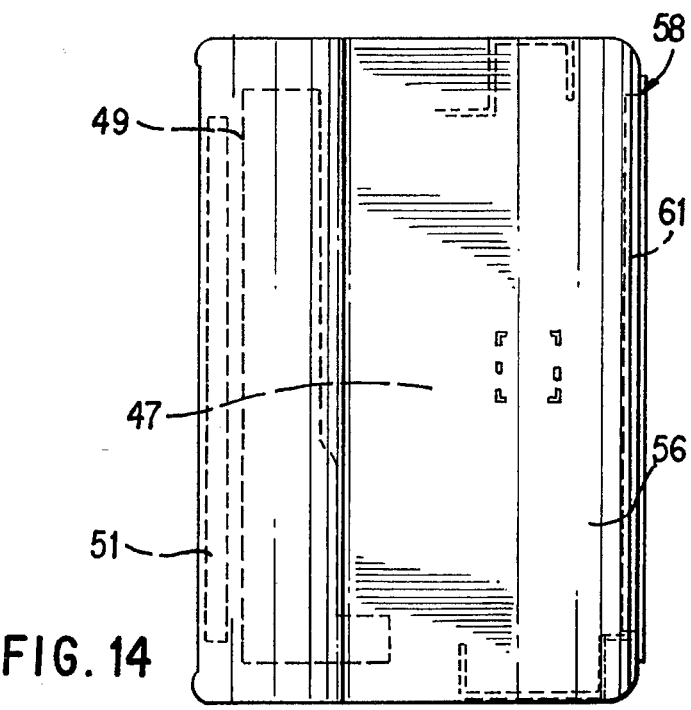
Figure 13:
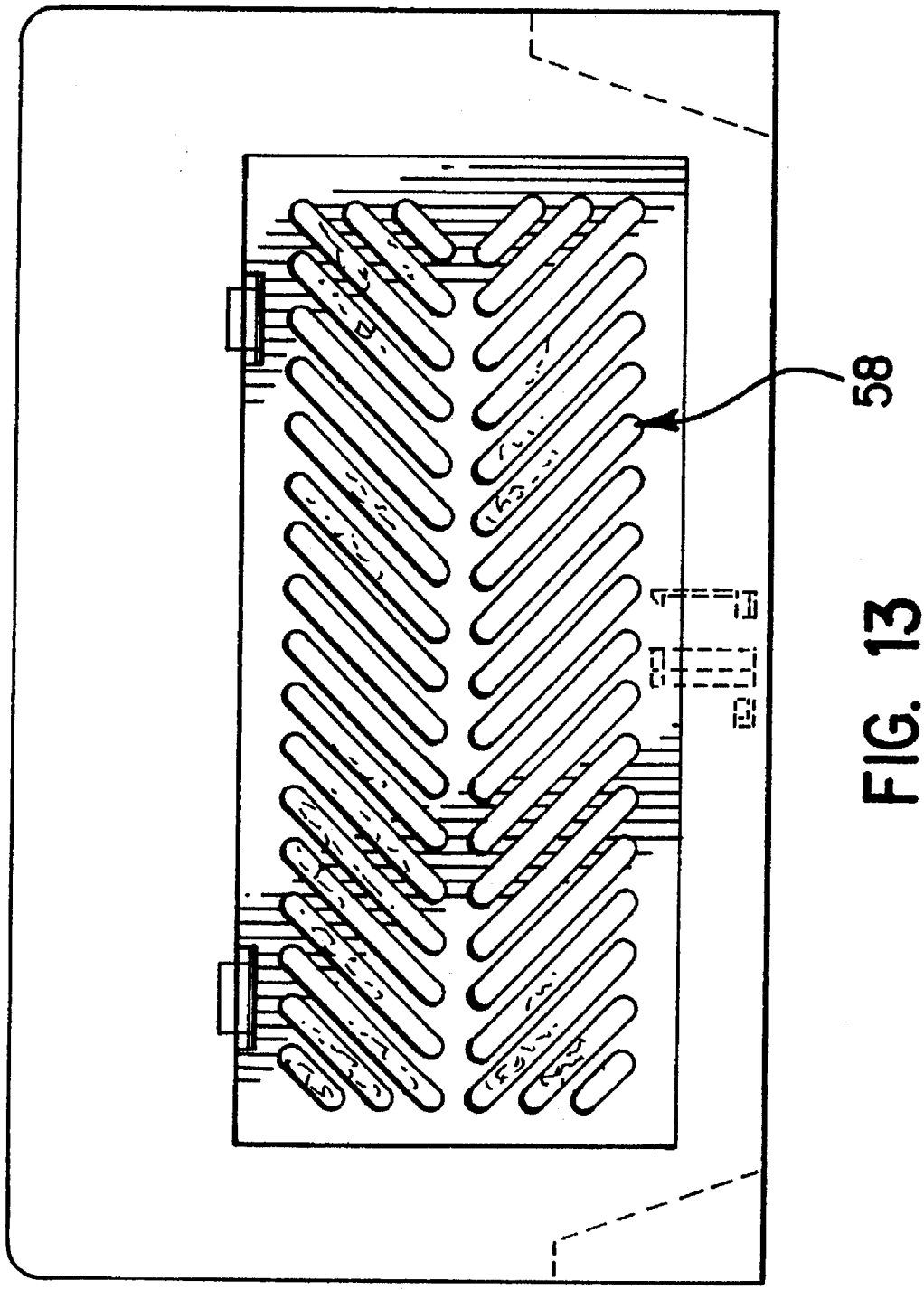
Figure 15:
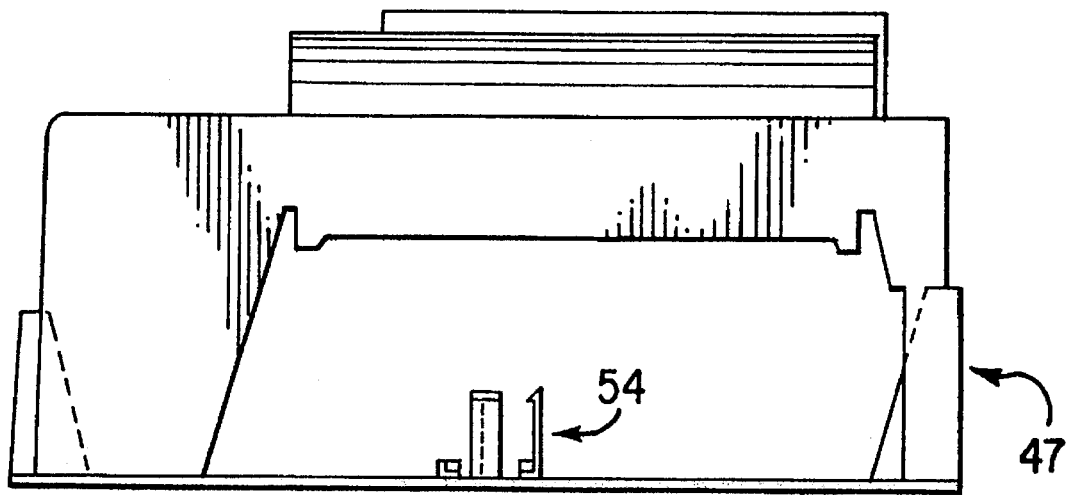
Figure 16:
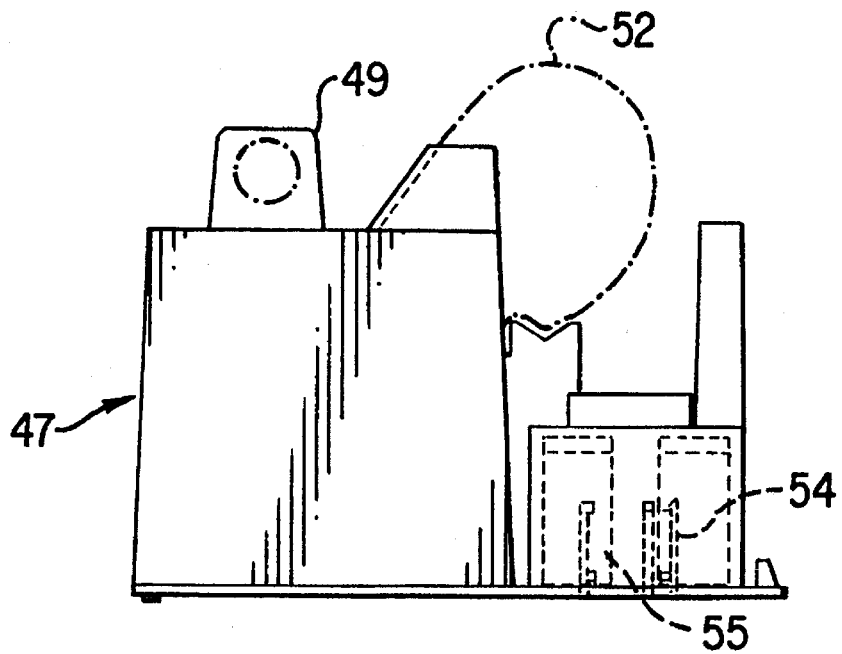

In FIG. 4 trough 9 is shown with the cover plate 13. The rearward portion 27 of the trough partly is positioned within casing 1 and is locked there in its working position. At the front side of the trough an exit 28 for the airstream is shown the cross section of which can be varied by means of a movable plate or the like in order to be able to vary the speed of the airstream exiting therefrom.

According to a further embodiment of the invention shown in FIG. 5 dispersing and spraying means 29 are provided within the water supply of trough 9 which are activated by means of a generator 30. This allows that part of the water volume within the trough is sprayed and that the airstream generated by the ventilator carries at least pan of the sprayed water and discharges it into the room through the exit of the trough. An alternative embodiment is shown in FIG. 6 which shows a spraying nozzle 31 within the water volume of trough 9 and is operated by a pump 32. Instead of a pump 32, as shown in FIG. 7 schematically, the spraying nozzle 33 can be connected with a flexible container 34 which is acted upon by a driven excentric disc 35 arranged on shaft 36.

FIG. 8 shows schematically how the airstream of the ventilator when flowing between the cover plate and the water volume of trough 9 is mechanically influenced and diverted. To this extent, a barrier wall 37 is provided which is fixed to the cover plate 13 and extends downwardly. The barrier plate 37 can end above the water surface and in this way restrict the cross section for the airstream; alternatively, it can extend into the water volume so that the airstream is forced to flow through the water which results in an additional purifying and moistening effect. 38 is an alternative barrier plate which ends above the water surface. This type of barrier plate or ram element also can be fastened at the lateral walls of the trough.

In order to obtain an effect similar to the effect of brushwood used in saltworks, according to the invention a mesh wall 39 made from wire, plastics material, ceramics, or the like is provided at the entrance into the trough and is arranged vertically or slightly inclined. Water from the trough 9 is urged to flow downward and through this mesh wall with the result that the down-flowing water will be enriched with oxygen. If mineral salts or similar additives are provided within the water in the trough, which is possible with all embodiments of this invention, predetermined lateral effects are obtained which will have the effect of fragrances or the like, or also can have a healing effect. At the same time, the water flowing downwards in combination with the airstream will generate a sort of spray, which simulates the effect of the sea. Above the mesh wall 39 a hose 40 is provided from which through individual openings (similar to a garden hose) or through nozzles 41 fine water jets or water mist will exit and will flow down the mesh wall 39 back into the water volume. The water is circulated from the water volume within trough 9 through a suction pipe 42 by means of a pump 43 into a supply pipe 44 and the pipe 40.

In FIGS. 12–16 the device according to this invention is shown in a special and preferred practical embodiment. The device comprises the actual apparatus 45 and the water trough or tray 46 coupled thereto which in the operating condition partly is arranged within the device is locked therein. The apparatus 45 has a bottom portion 47 with support 48 for receiving the trough 46, the casing 49 of the ultraviolet lamp, the support 50 for the mesh, and the support 51 for the waterdistributor bar. The bottom portion 47 (FIG. 16) also includes the support means 52 for the ventilator or fan and the wall portions 53 of the air passage channel, the support 54 for the pump, etc. The upper portion 56 comprises the cover hood 57, the filter means 58, the sockets for the switches for the ventilator, the pump etc. The filter means 58 include an inner grid 59 fastened to the cover hood 57, an outer grid 60 loosably connected with the cover hood 57, and a filter fleece 61 arranged between grids 59 and 60, which filter fleece is changeable by opening the outer grid 60.

What is claimed:

1. A method for purifying and moistening air within restricted areas, especially living and working rooms, according to which a fan-driven air stream is drawn into a casing of an air treating device, is filtered at an entrance of said device, is sterilized by ultraviolet radiation, is brought into contact with a water supply, and is discharged into a room as a purified and moistened air stream, the method comprising the steps of:

passing an air stream through a channel-type passageway provided within a casing of an air treating device, sterilizing said air stream by ultraviolet radiation within said passageway, passing said air stream through an extension of said passageway over a substantially stagnant relatively large surface-area of a water supply provided within a tray and through an air channel formed by said water surface, a corrugated cover plate and side walls of said tray, and introducing discontinuities into said water surface of said tray and said air stream between said water supply and said cover plate above said water surface.

2. A method according to claim 1, wherein said step of introducing said discontinuities is performed by rotating a wheel arranged transverse to said air stream and by a combination of said passage of said airstream and movement of said water supply creates said discontinuities so that air forming said air stream is moistened and enriched with oxygen.

3. A method according to claim 1, wherein wave-like movements are generated on said water surface by pumping water within said tray in a closed circuit and by a combination of said passage of said air stream and movement of said water supply to create said discontinuities so that air is moistened and is enriched with oxygen.

4. An air purifying and moistening device comprising a casing including a suction section having an air entrance opening, filter means at said opening and a motor-driven fan adjacent said opening, and an air purifying section including ultraviolet radiation sterilization lamp means, said air purifying section being arranged downstream of said suction section, and further comprising a water supply section within which sterilized air is brought into contact with a water surface of said water supply, before it is discharged into a room, said water supply section being attached to said casing, wherein said casing forms a substantially closed air passage channel and said water supply section is formed by a surface of said water supply, lateral walls, a front and rear wall of a tray, and a cover plate above said water surface, said tray being disposed as an outside extension of said casing, said tray containing said water supply so as to form a large-surface area of substantially stagnant water, and having a restricted outlet area within said rear wall, said cover plate of said water tray being removably arranged at a distance above said water surface, top edges of side walls of said tray being corrugated and said cover plate being corrugated so that said cover plate rests on said sidewalls in a substantially conforming manner, and means for introducing discontinuities in said water surface of said tray are provided.

5. A device as recited in claim 4, wherein said means for introducing discontinuities which includes a motor-driven rotating wheel means, a rotational access of which is arranged transverse to a direction of air flow, and said wheel means are arranged so that said water surface is engaged.

6. A device according to claim 4, wherein a pump is provided to pump said water within said tray in a closed circuit to generate wave-like movements on said water surface.

7. A device according to claim 4, wherein said tray is provided with a pump having dispersing means arranged to disperse part of said water supply from said tray over said water surface and into said air stream.

8. A device according to claim 4, wherein a water barrier is provided extending from said cover plate, transverse to said tray, said water barrier restricting said air channel between said cover plate and said water surface to pass said air stream from said casing through said water by purifying said air stream.

9. A device according to claim 4, further comprising an upright mesh wall made from one of metal, plastic and ceramic material, disposed adjacent to a transition between said fan and said water tray, said water being passed from a top to a bottom of said upright mesh wall into said tray.

10. A device according to claim 4, further comprising a water circulating pump having a connecting hose arranged within said tray, and a discharge hose disposed above an upright mesh wall.

11. A device according to claim 10, wherein said upright mesh wall has a relatively large surface area and salt is added to said water passing down said upright mesh wall.

12. A device according to claim 11, further comprising dispersing nozzles arranged at said top of said upright mesh wall to pass water down said upright mesh wall.

13. A device according to claim 4, wherein said filter means comprises an interior, non-releasable, filter grid fastened to said casing, an outer, non-releasable, filter grid fastened to and locked to said casing, and a removable filter mat disposed between said inner and outer filter grids.

14. A device according to claim 4, wherein said tray is removably fastened to said casing.

* * * * *